United States Patent
Dakshinamurthy et al.

(10) Patent No.: US 11,466,986 B2
(45) Date of Patent: Oct. 11, 2022

(54) MICROELECTROMECHANICAL SYSTEMS (MEMS) GYROSCOPE SENSE FREQUENCY TRACKING

(71) Applicant: INVENSENSE, INC., San Jose, CA (US)

(72) Inventors: Sriraman Dakshinamurthy, San Jose, CA (US); Carlo Pinna, Milan (IT); Ronak Chetan Desai, Santa Clara, CA (US)

(73) Assignee: INVENSENSE, INC., San Jose, CA (US)

( * ) Notice: Subject to any disclaimer, the term of this patent is extended or adjusted under 35 U.S.C. 154(b) by 222 days.

(21) Appl. No.: 16/221,415

(22) Filed: Dec. 14, 2018

(65) Prior Publication Data
US 2019/0186917 A1   Jun. 20, 2019

Related U.S. Application Data

(60) Provisional application No. 62/598,556, filed on Dec. 14, 2017.

(51) Int. Cl.
*G01C 19/5776* (2012.01)

(52) U.S. Cl.
CPC .............................. *G01C 19/5776* (2013.01)

(58) Field of Classification Search
CPC .................................................. G01C 19/5776
See application file for complete search history.

(56) References Cited

U.S. PATENT DOCUMENTS

| | | | | |
|---|---|---|---|---|
| 2003/0041667 A1* | 3/2003 | White | ................. | H03L 7/0991 73/504.12 |
| 2004/0008800 A1* | 1/2004 | White | ................. | G01C 19/42 375/376 |
| 2005/0091006 A1* | 4/2005 | Rober | ................. | G01C 19/56 702/189 |
| 2006/0238260 A1* | 10/2006 | Demma | ............... | G01C 19/56 331/10 |
| 2007/0052456 A1* | 3/2007 | Watson | .............. | H03L 7/06 327/113 |
| 2010/0253437 A1* | 10/2010 | Seeger | ................. | H03B 5/30 331/18 |
| 2011/0192226 A1* | 8/2011 | Hayner | ............. | G01C 19/5776 73/504.12 |

(Continued)

OTHER PUBLICATIONS

Perrott, Tutorial on Digital Phase-Locked Loops CICC 2009 (Year: 2009).*
Lexico, Oxford Dictionary definition for Electrode (Year: 2021).*

*Primary Examiner* — David L Singer
(74) *Attorney, Agent, or Firm* — Amin, Turocy & Watson, LLP

(57) ABSTRACT

Microelectromechanical systems (MEMS) gyroscopes and related sense frequency tracking techniques are described. Various embodiments facilitate sense frequency tracking and offset and/or sensitivity change compensation. Exemplary embodiments can comprise receiving a sense signal at an output of a MEMS gyroscope and determining a sense resonant frequency of the sense signal. In addition, exemplary methods can comprise generating an input sine wave with a frequency of the sense resonant frequency of the sense signal injecting the input sine wave into the MEMS gyroscope, to facilitate sense frequency tracking.

13 Claims, 10 Drawing Sheets

(56) References Cited

U.S. PATENT DOCUMENTS

| | | | | |
|---|---|---|---|---|
| 2012/0200326 A1* | 8/2012 | Buhmann | ............ | H03L 7/0991 |
| | | | | 327/156 |
| 2013/0268227 A1* | 10/2013 | Opris | ................ | G01C 19/5726 |
| | | | | 702/104 |
| 2014/0318243 A1* | 10/2014 | Forliti | ................ | G01C 19/5733 |
| | | | | 73/496 |
| 2015/0276407 A1* | 10/2015 | Bhandari | ............ | G01C 19/5776 |
| | | | | 73/504.12 |
| 2016/0003618 A1* | 1/2016 | Boser | ................ | G01C 19/5755 |
| | | | | 73/504.12 |
| 2016/0084654 A1* | 3/2016 | Senkal | ............... | G01C 19/5726 |
| | | | | 73/502 |
| 2017/0227572 A1* | 8/2017 | Malvern | ............... | G01P 15/125 |
| 2017/0328712 A1* | 11/2017 | Collin | ...................... | H03D 7/00 |
| 2019/0145773 A1* | 5/2019 | Collin | ................ | G01C 19/5776 |
| | | | | 73/504.12 |

* cited by examiner

MICROELECTROMECHANICAL SYSTEMS (MEMS) GYROSCOPE SENSE FREQUENCY TRACKING

PRIORITY CLAIM

This patent application is a Non-Provisional application of U.S. Provisional Application Ser. No. 62/598,556, filed Dec. 14, 2017, entitled "SENSE FREQUENCY TRACKING," the entirety of which is incorporated by reference herein.

TECHNICAL FIELD

The disclosed subject matter relates to microelectromechanical systems (MEMS) gyroscopes and related sense frequency tracking techniques.

BACKGROUND

Conventionally, microelectromechanical systems (MEMS) gyroscope require accurate trimming or adjusting to meet performance requirements such as sensitivity and offset accuracy. When a MEMS gyroscope is mounted on a customer's printed circuit board (PCB), the performance of the MEMS gyroscope, such as sensitivity and offset, has the potential to change. Moreover, when a MEMS gyroscope is subjected to environment variations such as temperature changes, package stresses, aging, and so on, the performance of the MEMS gyroscope has additional potential to change.

It is thus desired to provide abilities to improve MEMS gyroscope sensitivity and offset performance that address these deficiencies. The above-described deficiencies of MEMS gyroscopes are merely intended to provide an overview of some of the problems of conventional implementations, and are not intended to be exhaustive. Other problems with conventional implementations and techniques and corresponding benefits of the various non-limiting embodiments described herein may become further apparent upon review of the following description.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

In various non-limiting embodiments of the disclosed subject matter, systems, devices, and methods for facilitate sense frequency tracking and/or determination are described. For instance, exemplary non-limiting implementations provide apparatuses, systems, and methods that facilitate sense frequency tracking and/or determination associated with an exemplary MEMS gyroscope, which can be employed to improve sensitivity and/or offset performance over life time for exemplary MEMS gyroscopes.

Accordingly, exemplary embodiments can comprise receiving a sense signal at an output of a MEMS gyroscope and determining a sense resonant frequency (e.g., sense resonant frequency at the sense peak of the exemplary MEMS gyroscope) of the sense signal, for example, as further described herein. In addition, exemplary methods can comprise generating an input sine wave with a frequency of the sense resonant frequency of the sense signal injecting the input sine wave into the MEMS gyroscope, to facilitate sense frequency tracking as further described herein.

Other non-limiting implementations of the disclosed subject matter provide exemplary systems and apparatuses directed to these and/or other aspects described herein.

BRIEF DESCRIPTION OF THE DRAWINGS

Various non-limiting embodiments are further described with reference to the accompanying drawings in which.

DETAILED DESCRIPTION

Overview

While a brief overview is provided, certain aspects of the disclosed subject matter are described or depicted herein for the purposes of illustration and not limitation. Thus, variations of the disclosed embodiments as suggested by the disclosed apparatuses, systems and methodologies are intended to be encompassed within the scope of the subject matter disclosed herein. For example, the various embodiments of the apparatuses, techniques and methods of the disclosed subject matter are described in the context of MEMS sensors such as MEMS gyroscopes and related sense frequency tracking techniques. However, as further detailed below, various modifications can be made to the described techniques, without departing from the subject matter described herein.

As described in the background, to maintain high performance of MEMS gyroscopes, it is thus desired to provide abilities to improve MEMS gyroscope sensitivity and offset performance that compensates for changes in the MEMS gyroscopes over the lifetime of the MEMS gyroscopes.

Figure 1:
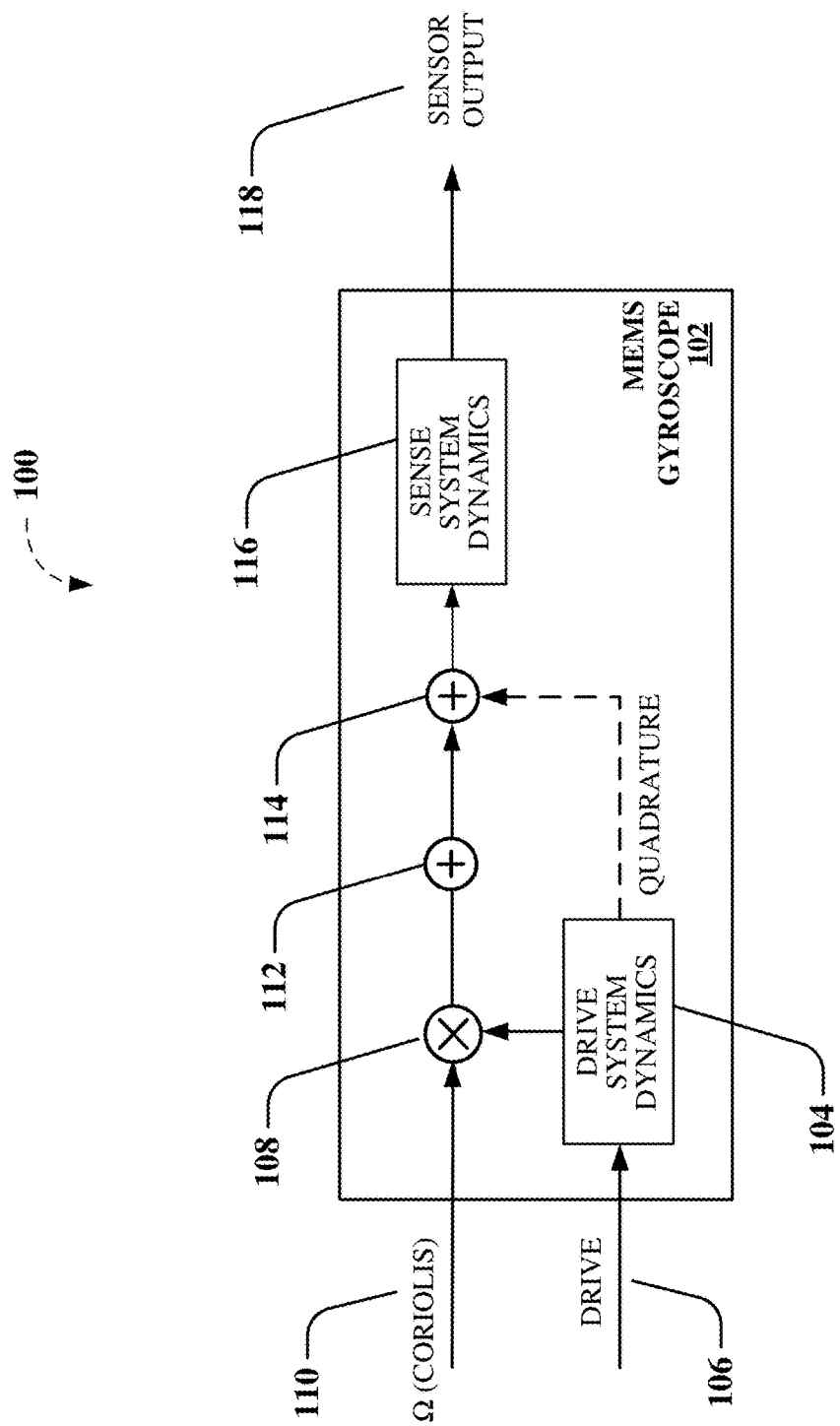
FIG. 1 depicts a non-limiting operating environment that illustrates a functional block diagram of an exemplary microelectromechanical systems (MEMS) gyroscope, in which various embodiments as described herein can be employed.

For instance, FIG. 1 depicts a non-limiting operating environment 100 that illustrates a functional block diagram of an exemplary MEMS gyroscope 102, in which various embodiments as described herein can be employed. Exemplary MEMS gyroscope 102 can comprise a drive subsystem 104 having a drive input signal 106. The exemplary MEMS gyroscope 102 is a passive element coupled to an active complementary metal oxide semiconductor (CMOS) element (not shown), which together form an oscillator, comprising a resonant mechanical device having a resonant frequency.

Figure 4:
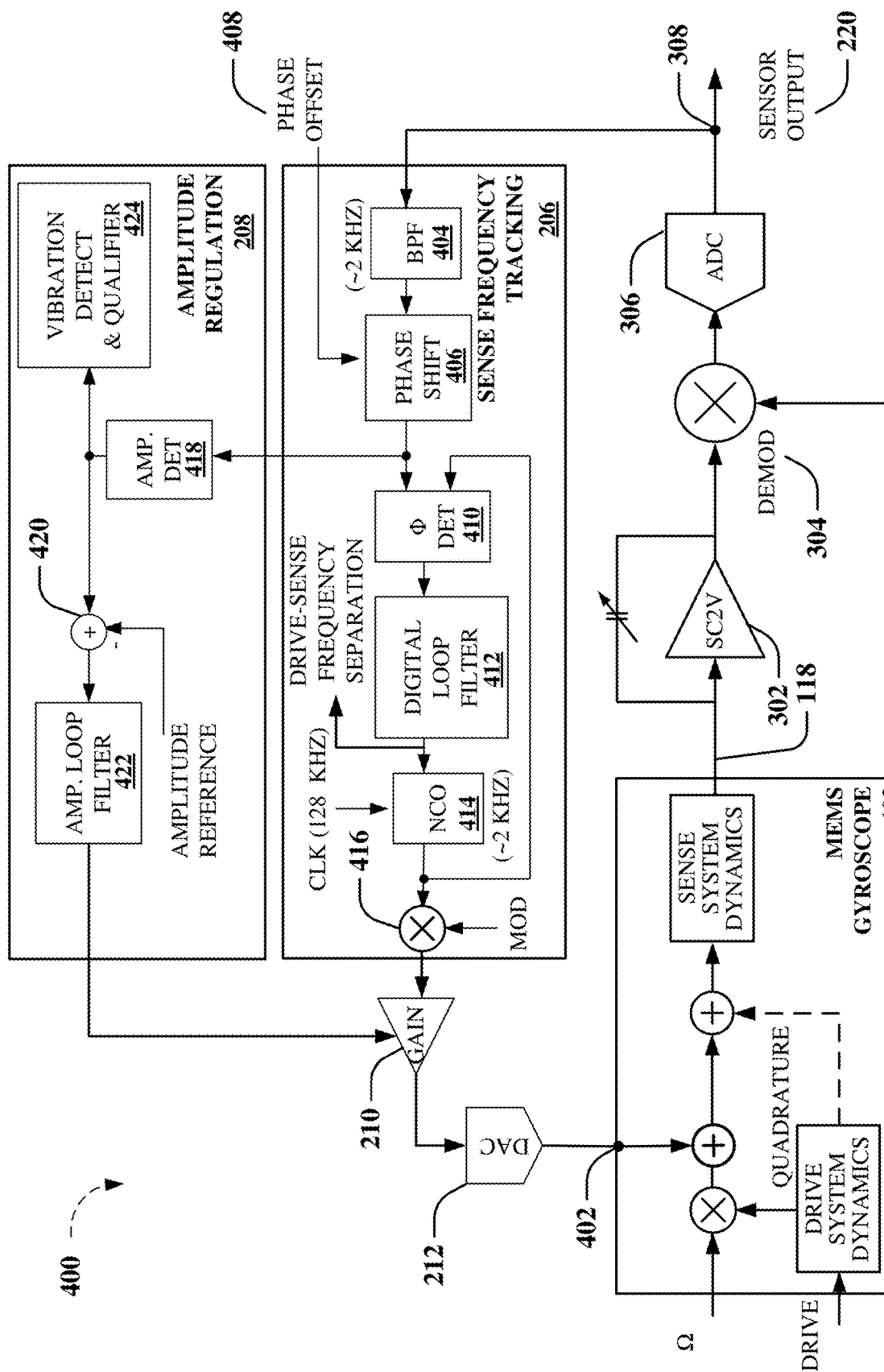
FIG. 4 depicts another functional block diagram of components of an exemplary system CMOS associated with exemplary MEMS gyroscope that facilitates sense frequency tracking, according to further non-limiting aspects as described herein.

For example, if you apply the resonant frequency to the MEMS gyroscope 102, the output of the MEMS gyroscope 102 will be the resonant frequency, plus a 90° phase shift. Coupling the CMOS element (not shown) to the MEMS gyroscope 102 creates an oscillator that can be driven to establish a drive oscillation. The resulting drive input signal 106, as a result of drive subsystem 104, produces a velocity vector which is modulated 108, with the incoming Coriolis signal 110. The velocity multiplied by the incoming Coriolis signal 110 is the signal of interest in exemplary MEMS gyroscope 102. Exemplary MEMS gyroscope 102 can further comprise a self-test port, for example, as shown in FIG. 4, which sums 112 into the sense path, comprising the Coriolis signal 110 modulated 108 by the velocity vector.

A leakage component of drive subsystem 104, represented as a dotted line, is an undesired and potentially unknown component referred to herein as a quadrature component or quadrature, and which is a representation of the displacement of the drive mechanism. The quadrature components sums 114 into the sense path, comprising the Coriolis signal 110 modulated 108 by the velocity vector, with a 90° offset.

Exemplary MEMS gyroscope 102 can further comprise a sense subsystem 116 having its own resonance, which, among other phenomena, causes a phase shift cp. For instance, exemplary MEMS gyroscope 102 can comprise one or more sense electrodes (not shown) configured to sense a Coriolis 110 component, which is the desired signal of the sense electrode(s). The quadrature signal is an undesired signal present as a result of small misalignments or mechanical tilts in the MEMS gyroscope 102 drive subsystem 104 during the MEMS gyroscope 102 drive mechanism oscillations. Moreover, the drive subsystem 104 and the sense subsystem 116 each have their own resonant frequencies, and the separation of the drive subsystem 104 frequency to the sense subsystem 116 frequency can be shown to be related to the sensitivity of the device.

Thus, the output signal 118 of an exemplary MEMS gyroscope 102 is a result of two phenomena. One, a displacement or position vector of the MEMS gyroscope 102 element is a sine wave. And two, velocity of the MEMS gyroscope 102 element is a derivative of position vector, which is a cosine wave, which is 90° out of phase from the displacement or position vector. As described, the velocity of the MEMS gyroscope 102 element will modulate any Coriolis signal 110 applied to the MEMS gyroscope 102, and the output can be sensed through the sense path. Any quadrature that is present in the MEMS gyroscope 102 will be modulated by the position vector and summed with the Coriolis signal 110 modulated 108 by the velocity vector.

Because of this property, the output of the MEMS gyroscope 102 will have two fundamental signal components. One is the quadrature component, which is modulated by the position vector. And the other is the Coriolis component, which is modulated by the velocity vector. When a MEMS gyroscope 102 is trimmed in the factory (e.g., by adding an offset), special attention is made to align the demodulation phase or demod phase of the CMOS, which is a parameter that represents an angle, such that it aligns orthogonally to the quadrature component coming from the MEMS gyroscope 102, as further described below. Ideally, the quadrature component is a quasi-static signal (e.g., sine wave of fixed amplitude), which when demodulated appears as a fixed offset. So long as the quadrature component does not vary in phase or amplitude, the known quadrature component can be trimmed in the factory (e.g., by adding an offset). Thus, to maintain high performance of MEMS gyroscope 102, the demod phase of the demodulator should be 90° away from the quadrature component.

However, as described above, when a MEMS gyroscope 102 is mounted on a customer's printed circuit board (PCB), the performance of the MEMS gyroscope 102, such as sensitivity and offset, has the potential to change. Moreover, when a MEMS gyroscope 102 is subjected to environment variations such as temperature changes, package stresses, aging, and so on, the performance of the MEMS gyroscope 102 has additional potential to change.

Exemplary Embodiments

As described above, the drive subsystem 104 and the sense subsystem 116 each have their own resonant frequencies, and the separation of the drive subsystem 104 frequency to the sense subsystem 116 frequency can be shown to be related to the sensitivity of the device. Various non-limiting embodiments as described herein can facilitate tracking the separation of the two frequencies (e.g., sense frequency tracking) at the respective peaks of the drive subsystem 104 frequency and the sense subsystem 116 frequency, to facilitate identifying a frequency shift in the sense frequency, which can be related to a change in sensitivity of MEMS gyroscope 102, and which change can be compensated for to improve sensitivity performance of the MEMS gyroscope 102, as further described herein. In addition, the offset of a MEMS gyroscope 102 can vary over the life of the MEMS gyroscope 102 due to stress or temperature variation, etc. Further non-limiting embodiments can employ sense frequency tracking to facilitate improve offset performance of the MEMS gyroscope 102, for example, as further described herein.

Figure 2:
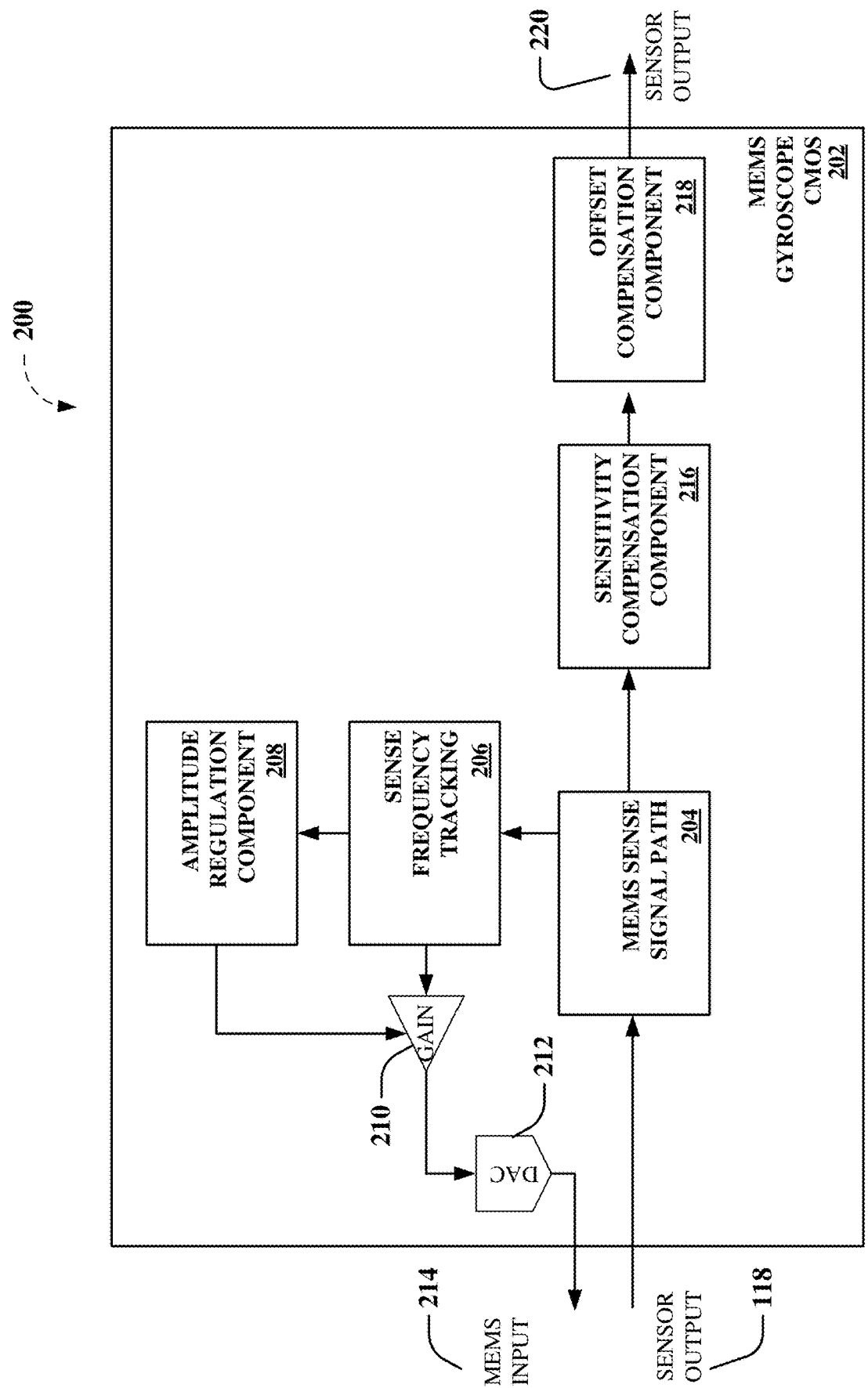
FIG. 2 depicts a functional block diagram of an exemplary system complementary metal oxide semiconductor (CMOS) associated with an exemplary MEMS gyroscope that facilitates sense frequency tracking, as described herein.

For example, FIG. 2 depicts a functional block diagram 200 of an exemplary CMOS 202 associated with an exemplary MEMS gyroscope 102 that facilitates sense frequency tracking, as described herein. Various non-limiting embodiments as described herein can facilitate sense frequency tracking to facilitate compensating for sensitivity and/or offset changes, as further described herein. According to non-limiting aspects, an exemplary MEMS gyroscope 102 CMOS 202 can comprise an exemplary MEMS gyroscope 102 sense signal path 204, which can be coupled to exemplary MEMS gyroscope 102 sensor output 118, for example, as further described herein, regarding FIGS. 3-4, and which can be configured with a tap-off point (not shown) in the MEMS gyroscope 102 sense signal path 204 that has sufficient bandwidth to represent the sense resonant frequency at the sense peak of the exemplary MEMS gyroscope 102 to facilitate sense frequency tracking.

In addition, exemplary MEMS gyroscope 102 CMOS 202 can comprise an exemplary sense frequency tracking component 206, for example, as further described herein, regarding FIG. 4, which can be described generally as a frequency to digital converter. In a non-limiting aspect, an exemplary sense frequency tracking component 206 can be configured to determine the sense resonant frequency of the sense signal, for example, as further described herein, regarding FIG. 4. In a further non-limiting aspect, exemplary sense frequency tracking component 206 can be further configured to generate an input sine wave with a frequency of the sense resonant frequency of the sense signal, for example, as further described herein, regarding FIG. 4. Further non-limiting aspects of exemplary sense frequency tracking component 206 are described below regarding FIG. 4.

Exemplary MEMS gyroscope 102 CMOS 202 can further comprise an exemplary amplitude regulation component 208, for example, as further described herein, regarding FIG. 4. In a non-limiting aspect, an exemplary amplitude regulation component 208 can be configured to detect an output amplitude of the sense signal at a sense peak, for example, as further described herein, regarding FIG. 4. In a further non-limiting aspect, exemplary amplitude regulation component 208 can be further configured to regulate an input amplitude of the input sine wave (e.g., generated via exemplary sense frequency tracking component 206) based on the output amplitude of the sense signal at the sense peak, for example, as further described herein, regarding FIG. 4. As a non-limiting example, exemplary amplitude regulation component 208 can be further configured to regulate the input amplitude of the input sine wave injected into the MEMS gyroscope 102 via controlling gain (e.g., via gain adjustment 210) of the input sine wave injected into the MEMS gyroscope 102 via an automatic gain control loop (not shown), as further described herein, regarding FIG. 4.

In further non-limiting aspects, exemplary amplitude regulation component 208 can further comprise or be associated with an exemplary vibration detection component (not shown), as further described herein, regarding FIG. 4. In a non-limiting aspect, exemplary vibration detection component (not shown) can be configured to determine that the sense resonant frequency is invalid due to a determination of a detected vibration, for example, as further described herein, regarding FIG. 4. In a further non-limiting aspect, exemplary vibration detection component (not shown) can be configured to determine that the input amplitude of the sense signal at the sense peak falls outside of a predetermined amplitude range for normal MEMS gyroscope 102 operation.

In addition, exemplary MEMS gyroscope 102 CMOS 302 can comprise an exemplary digital to analog converter (DAC) 212 and/or one or more other components configured to provide a MEMS input 214 to MEMS gyroscope 102 sense signal, for example, as further described herein, regarding FIGS. 2, 4, etc. For instance, introduction of a MEMS input 214 signal into the self-test port, for example, as shown in FIG. 4, which sums 112 into the sense path, comprising the Coriolis signal 110 modulated 108 by the velocity vector. The result of the provided MEMS input 214 signal appears as a Coriolis force signal. According to non-limiting aspects, various embodiments as described herein can facilitate providing a MEMS input 214 signal into the self-test port as shown in FIG. 4, at the sense frequency, as determined by sense frequency tracking component 206, for example.

Figure 5:
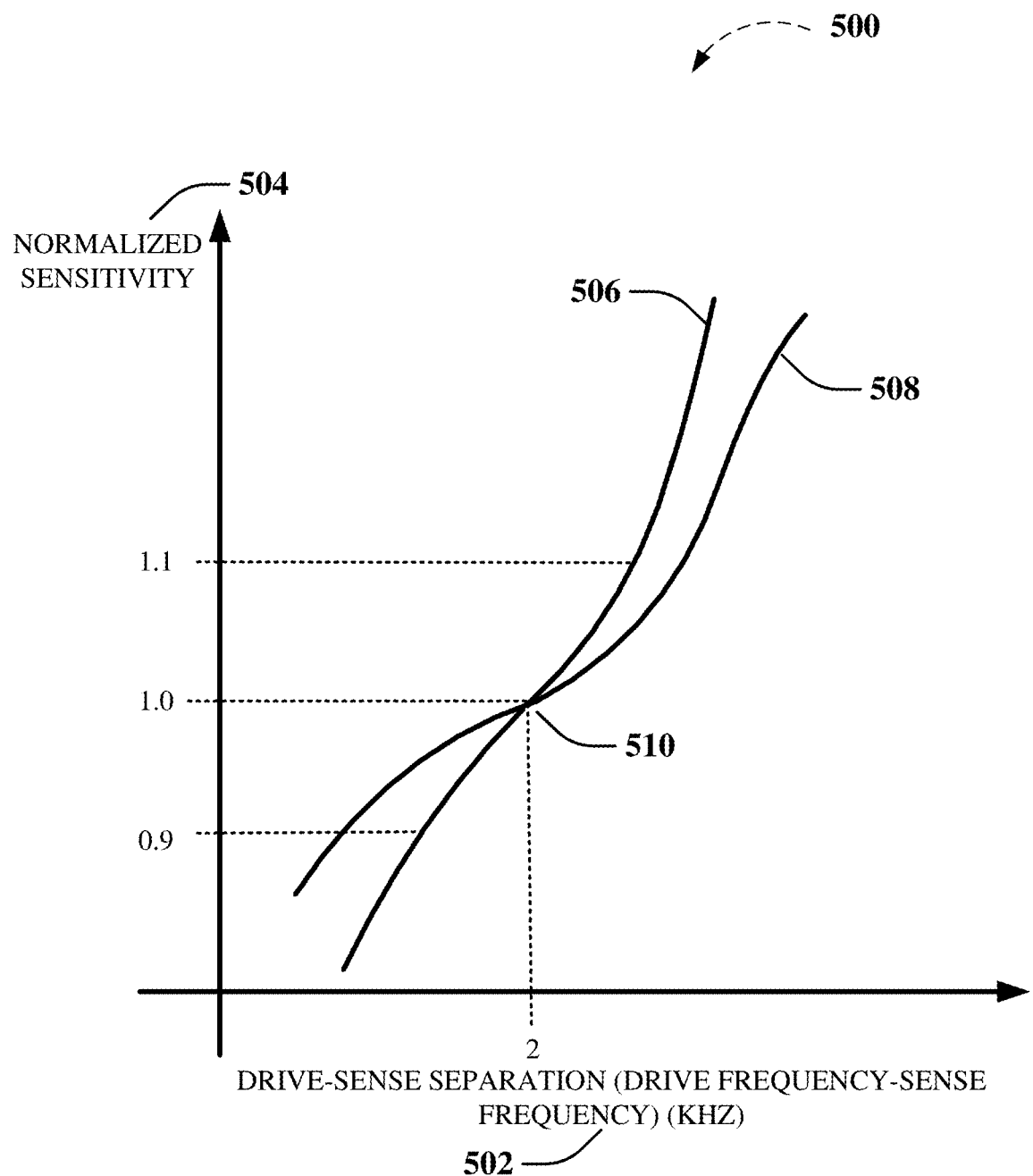
FIG. 5 depicts an exemplary relation of drive-sense separation to normalized sensitivity associated with an exemplary MEMS gyroscope, according to various aspects as described herein.

In addition, exemplary MEMS gyroscope 102 CMOS 202 can comprise an exemplary sensitivity compensation component 216, for example, as further described herein, regarding FIG. 5. In a non-limiting aspect, an exemplary sensitivity compensation component 216 can be configured to compensate for a sensitivity change associated with the MEMS gyroscope 102 based on the determined sense resonant frequency of the sense signal (e.g., via exemplary sense frequency tracking component 206) and a relationship between drive-sense separation, for instance, as further described herein regarding FIG. 5.

Figure 6:
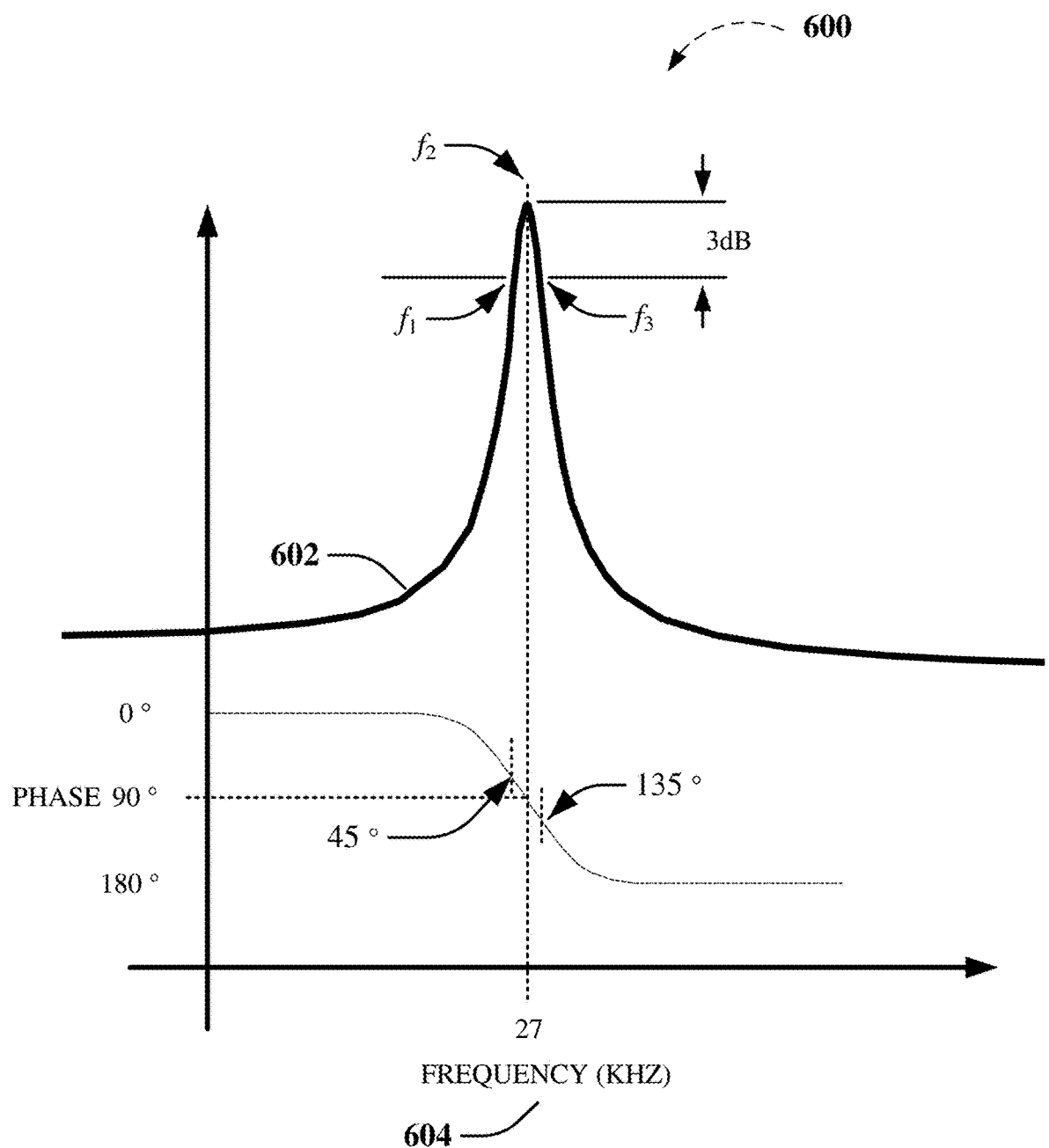
FIG. 6 depicts an exemplary plot of a resonance peak illustrating non-limiting aspects of sense resonant frequency and Q determination for an associated MEMS gyroscope 102, according to non-limiting embodiments described herein.
Figure 7:
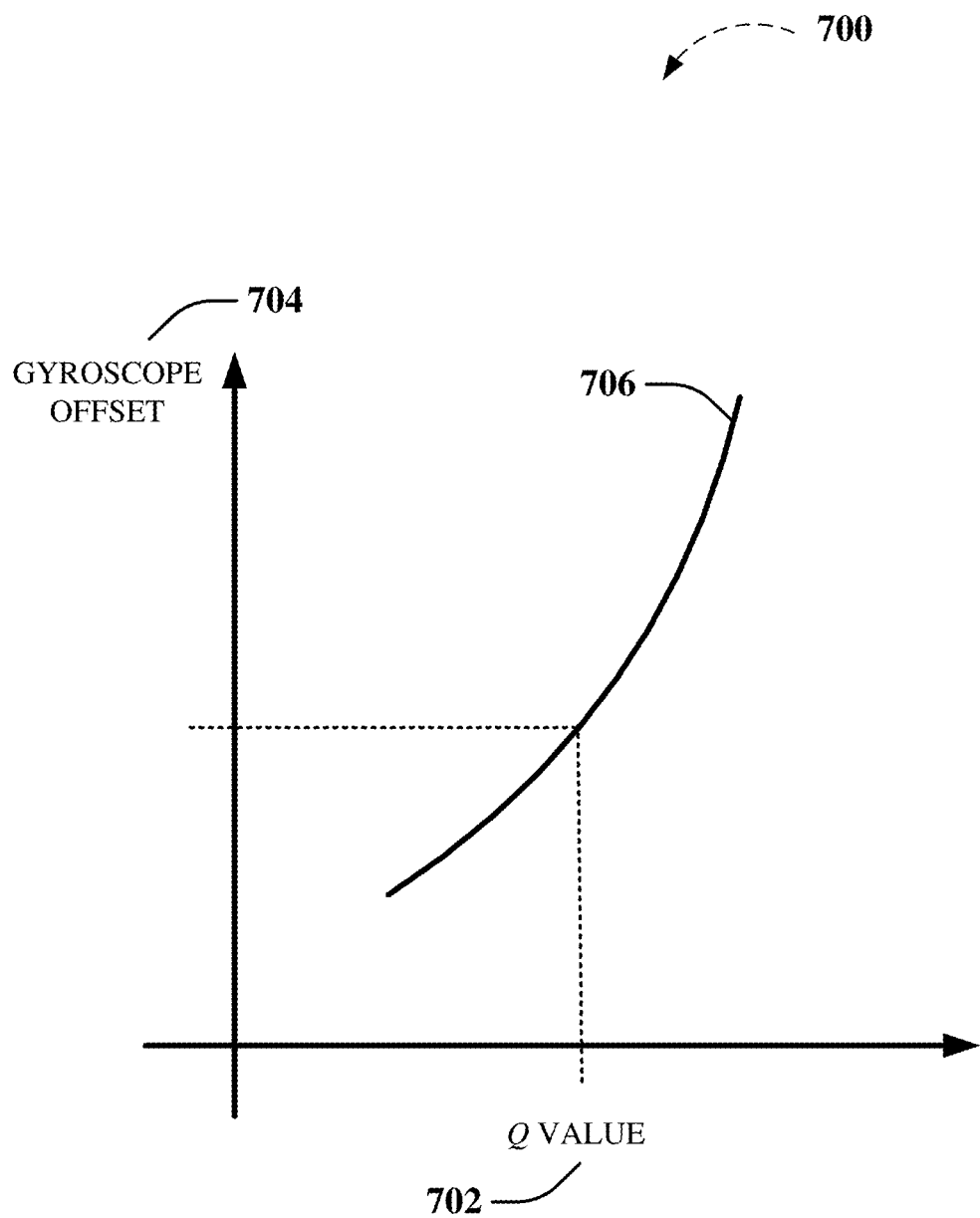
FIG. 7 depicts an exemplary plot of an exemplary relation of Q versus gyroscope offset that facilitates offset determination for an associated MEMS gyroscope, according to various aspects described herein.

Exemplary MEMS gyroscope 102 CMOS 202 can further comprise an exemplary offset compensation component 218, for example, as further described herein, regarding FIGS. 6-7. In a non-limiting aspect, an exemplary offset compensation component 218 can be configured to compensate for an offset change associated with the MEMS gyroscope 102 based on the determined sense resonant frequency of the sense signal (e.g., via exemplary sense frequency tracking component 206) and a determined quality factor (Q), for instance, as further described herein regarding FIGS. 6-7. Thus, the resulting signal can be passed as sensor output 220.

Figure 3:
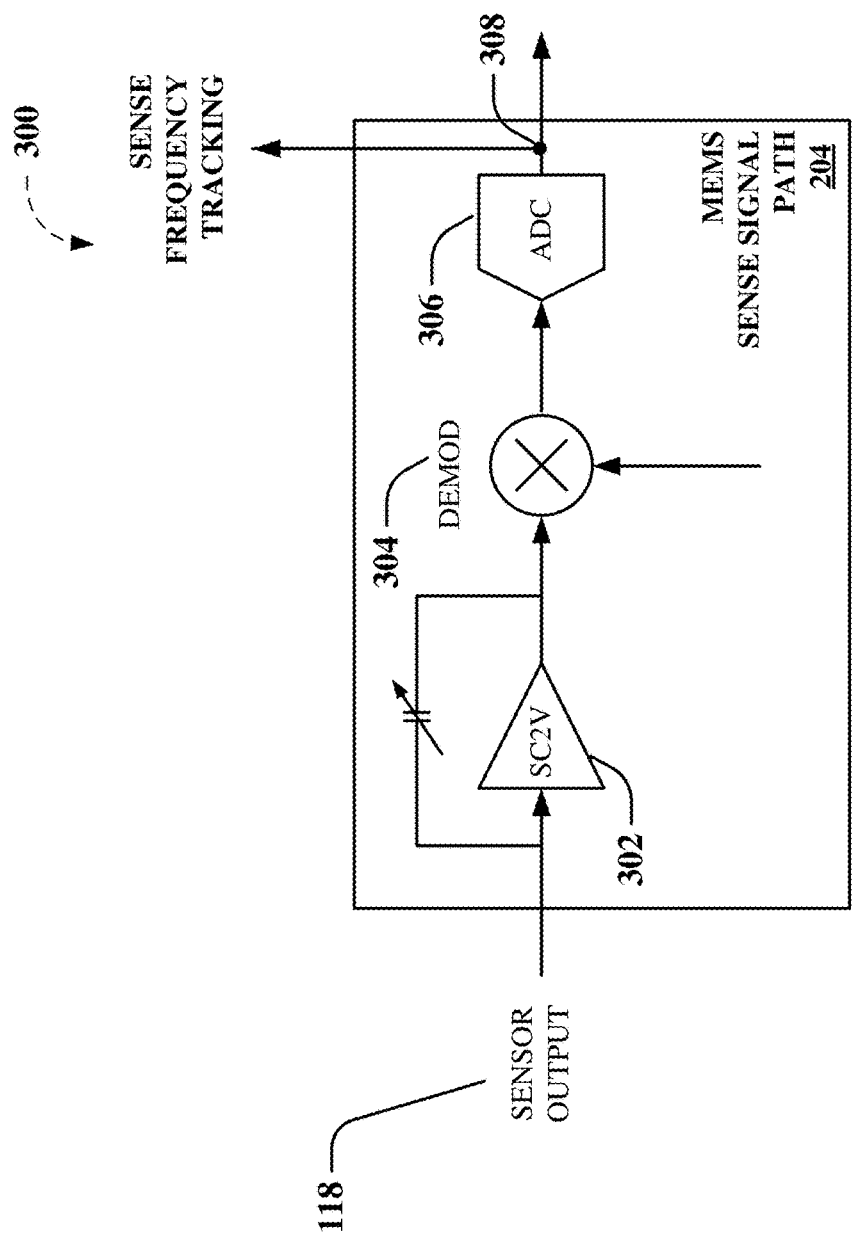
FIG. 3 depicts a functional block diagram of exemplary components of an exemplary MEMS gyroscope sense signal path as depicted in FIG. 2, according to non-limiting aspects.

FIG. 3 depicts a functional block diagram 300 of exemplary components of an exemplary MEMS gyroscope 102 sense signal path 204 as depicted in FIG. 2, according to non-limiting aspects. According to various non-limiting embodiments, sensor output 118 can be communicatively coupled to exemplary MEMS gyroscope 102 CMOS 302 CMOS amplifier comprising sense subsystem capacitance to voltage converter (SC2V) 302, which is an active circuit, the output of which can provide a scaled version of the input plus phase shift.

According to further non-limiting embodiments, exemplary MEMS gyroscope CMOS 302 can comprise demodulator mixer or demod 304 that can be configured to multiply a reference sine wave (not shown) with the sense sine wave (e.g., output of SC2V 302), the phase of which reference sine wave can be controlled by a phase demodulation control or demod control (not shown). Thus, the resulting signal is downconverted and then processed via analog to digital converter (ADC) 306, before being processed via an additional one or more filters (not shown) or other components as described regarding FIG. 2 prior to being passed as sensor output 220.

As further described above, various non-limiting embodiments as described herein can comprise the ability to facilitate sense frequency tracking, for example, as described regarding FIGS. 2 and 4. According to non-limiting aspects, an exemplary MEMS gyroscope 102 CMOS 202 can comprise exemplary MEMS gyroscope 102 sense signal path 204 having a tap-off point 308 in the MEMS gyroscope 102 sense signal path 204 that has sufficient bandwidth to represent the sense resonant frequency at the sense peak of the exemplary MEMS gyroscope 102 to facilitate sense frequency tracking, for example, as described regarding FIGS. 2 and 4. In further non-limiting aspects, tap-off point 308 in the MEMS gyroscope 102 sense signal path 204 can be located between filters (not shown) in the MEMS gyroscope 102 sense signal path 204.

FIG. 4 depicts another functional block diagram of components of an exemplary system CMOS 202 associated with exemplary MEMS gyroscope 102 that facilitates sense frequency tracking, according to further non-limiting aspects as described herein. As described above regarding FIG. 1, the resulting drive input signal 106, as a result of drive subsystem 104, produces a velocity vector which is modulated 108, with the incoming Coriolis signal 110. The velocity multiplied by the incoming Coriolis signal 110 is the signal of interest in exemplary MEMS gyroscope 102. The exemplary MEMS gyroscope 102 is a passive element coupled to exemplary MEMS gyroscope 102 CMOS 202, which together form an oscillator, comprising a resonant mechanical device having a resonant frequency. Exemplary MEMS gyroscope 102 can further comprise a self-test port 402, which sums 112 into the sense path, comprising the Coriolis signal 110 modulated 108 by the velocity vector. Self-test port can receive the MEMS input 214 signal, which appears as a Coriolis force signal, at the sense frequency, as determined by sense frequency tracking component 206, for example, as further described herein.

As further described above, exemplary MEMS gyroscope 102 CMOS 202 can comprise exemplary MEMS gyroscope 102 sense signal path 204 having a tap-off point 308 in the MEMS gyroscope 102 sense signal path 204 that has sufficient bandwidth to represent the sense resonant frequency at the sense peak of the exemplary MEMS gyroscope 102 to facilitate sense frequency tracking, for example, as described regarding FIGS. 2 and 4.

As described above, the drive subsystem 104 and the sense subsystem 116 each have their own resonant frequencies, and the separation of the drive subsystem 104 frequency to the sense subsystem 116 frequency can be shown to be related to the sensitivity of the device. For example, by tracking the separation of these frequencies, various embodiments can facilitate detecting a sense frequency shift and relate that to a change in sensitivity of the exemplary MEMS gyroscope 102. At tap-off point 308 in the MEMS gyroscope 102 sense signal path 204, the sine wave frequency at the output of ADC 306 is the difference between the drive frequency and the sense frequency of exemplary MEMS gyroscope 102. As a non-limiting example, assume drive frequency is 29 kiloHertz (kHz) and sense frequency is 27 kHz, such that, when signal gets downconverted by the demodulator mixer 304, which is operating at the drive frequency, then the 27 kHz sense frequency will appear as a 2 kHz signal at the output of ADC 306.

As described above, exemplary MEMS gyroscope 102 CMOS 202 can comprise a sense frequency tracking component comprising an exemplary sense frequency tracking component 206. In a non-limiting aspect, an exemplary sense frequency tracking component 206 can be configured to determine the sense resonant frequency of the sense signal (e.g., at tap-off point 308), for example, as further described herein. Thus, various embodiments as described herein can generate the MEMS input 214 signal via the sense frequency tracking component 206 and amplitude regulation component 208, to be applied at self-test port 402 at the sense frequency.

For instance, exemplary sense frequency tracking component can comprise a bandpass filter (BPF) 404 (e.g., a roughly 2 kHz) that can be configured to receive the sense signal (e.g., at tap-off point 308). Exemplary MEMS gyroscope 102 CMOS 202 can further comprise a phase shifter 406 that can be configured to phase shift the sense signal 90 degrees to determine the sense resonant frequency, configured to phase shift the sense signal ninety degrees plus and minus a phase offset 408, configured to estimate frequencies corresponding to the ninety degrees and the ninety degrees plus and minus the phase offset 408, and configured to determine a quality factor (Q) for the sense resonant frequency based on sense resonance, for example, as further described herein, regarding FIGS. 6-7.

In addition, exemplary sense frequency tracking component can be configured as a digital phase locked loop comprising a phase detector 410, a digital loop filter 412, and a numerically controlled oscillator (NCO) 414 configured to estimate the sense resonant frequency of the sense signal.

As a non-limiting example, exemplary phase detector 410 can be configured to receive an input frequency via the BPF 404 and its own loop signal output frequency from NCO 414, such that when both signals match in frequency and phase, then the output of phase detector 410 is zero. Accordingly, at steady state, the sense frequency tracking component 206 will return a digital representation of the input sense resonant frequency of the sense signal (e.g., at tap-off point 308). The output of exemplary phase detector 410 is passed through digital loop filter 412 into exemplary NCO 414, which receives as an input a digital code representative of the input frequency, or the digital representation of the drive-sense frequency separation.

In a further non-limiting aspect, exemplary sense frequency tracking component 206 can be further configured to generate an input sine wave for injection into the MEMS gyroscope 102 (e.g., via the self-test port as shown in FIG. 4) with a frequency of the sense resonant frequency of the sense signal.

As a non-limiting example, exemplary NCO 414 can be configured to generate an output sine wave with a frequency of the sense resonant frequency of the sense signal (e.g., at tap-off point 308) or approximately 2 kHz. In a non-limiting aspect, exemplary NCO 414 can comprise an oscillator that generates a frequency signal that is synchronized to the reference frequency signal both in frequency and phase employing a (CLK) (e.g., 128 kHz), which has fixed relationship to the drive subsystem frequency (e.g., such as via a PLL), to generate an output sine wave with a frequency of the sense resonant frequency of the sense signal (e.g., at tap-off point 308) or approximately 2 kHz. According to further non-limiting aspects, the generated NCO 414 frequency output can be modulated 416 using the drive signal which translates the approximately 2 kHz signal into a signal of the sense frequency, which is about 27 kHz, which can then be gain adjusted 210 and applied through DAC 212 to exemplary MEMS gyroscope 102. In further non-limiting embodiments, exemplary NCO 414 can be configured to directly generate the signal of the sense frequency, which is about 27 kHz.

Accordingly, exemplary sense frequency tracking component 206 forms an oscillator with a frequency of the sense resonant frequency of the sense signal (e.g., at tap-off point 308). As further described above, exemplary MEMS gyroscope 102 CMOS 202 can further comprise an exemplary amplitude regulation component 208. In a non-limiting aspect, an exemplary amplitude regulation component 208 can be configured to detect an output amplitude of the sense signal at a sense peak, for example, as further described herein. As a non-limiting example, exemplary amplitude regulation component can be configured to enforce the amplitude of oscillation of exemplary sense frequency tracking component 206 to be equal to the amplitude reference signal (e.g., sense resonant frequency of the sense signal (e.g., at tap-off point 308) and can be configured to control the amplitude by modulating the gain (e.g., via gain adjustment 210) of the sine wave applied self test port 402 to exemplary MEMS gyroscope 102.

In a further non-limiting aspect, exemplary amplitude regulation component 208 can be further configured to regulate an input amplitude of the input sine wave (e.g., generated via exemplary sense frequency tracking component 206) based on the output amplitude of the sense signal at the sense peak. In a non-limiting aspect, exemplary amplitude regulation component 208 can comprise exemplary amplitude detection component 418 and amplitude loop filter 422, which can enforce amplitude of oscillation to be equal to the amplitude reference signal via summing junction 420 to control the amplitude of the input sine wave (e.g., generated via exemplary sense frequency tracking component 206) by modulating the gain (e.g., via gain adjustment 210) of the sine wave applied to self test port 402 to exemplary MEMS gyroscope 102. In a non-limiting aspect, an exemplary amplitude reference signal can comprise a user established reference value (e.g., 100 degrees per second (dps), etc.).

Thus, in various non-limiting embodiments, exemplary amplitude regulation component 208 can be configured to regulate the input amplitude of the input sine wave injected into the MEMS gyroscope 102 via controlling gain (e.g., via gain adjustment 210) of the input sine wave injected into the MEMS gyroscope 102 via an automatic gain control (AGC) loop comprising summing junction 420 amplitude loop filter 422 and gain adjustment 210.

In further non-limiting aspects, exemplary amplitude regulation component 208 can further comprise or be associated with an exemplary vibration detection component or vibration detection and qualifier component 424. In a non-limiting aspect, exemplary vibration detection component or vibration detection and qualifier component 424 can be configured to determine that the sense resonant frequency is invalid due to a determination of a detected vibration. In a further non-limiting aspect, exemplary vibration detection component 424 can be configured to determine that the input amplitude of the sense signal at the sense peak falls outside of a predetermined amplitude range for normal MEMS gyroscope 102 operation.

As a non-limiting example, at steady state assuming a clean sine wave of 29 kHz, a mechanical shock in the vicinity of 29 kHz could corrupt the amplitude regulation of exemplary amplitude regulation component 208. For instance, if the expected amplitude is in the vicinity of the user-defined amplitude reference (e.g., 100 dps) and there is a detected amplitude (e.g., via exemplary vibration detection component or vibration detection and qualifier component 424) of 90 dps or 110 dps, then the sense frequency can be considered to be inaccurate such that exemplary vibration detection component or vibration detection and qualifier component 424 can be configured as a qualifier for the sense frequency tracking component 206.

Accordingly, exemplary apparatuses as described herein can comprise a MEMS gyroscope 102 having an electrode (e.g., via self-test port 402) that can inject a force signal into the MEMS gyroscope 102 and a gyroscope sense path (e.g., exemplary MEMS gyroscope 102 sense signal path 204) configured to allow the detection of a sense signal at a sense peak, for example, as further described herein, regarding FIGS. 1-7.

Exemplary apparatuses can further comprise a sense frequency tracking component 206 configured to determine a sense resonant frequency (e.g., sense resonant frequency at the sense peak of the exemplary MEMS gyroscope 102) of the sense signal at the sense peak. As a non-limiting example, the sense frequency tracking component 206 can comprise a phase detector 410, a digital loop filter 412, and a NCO 414 configured to estimate the sense resonant frequency (e.g., sense resonant frequency at the sense peak of the exemplary MEMS gyroscope 102) of the sense signal, for example, as further described herein, regarding FIGS. 1-7. As a further non-limiting example, an output of the NCO 414 is modulated 416 with a function of a drive frequency associated with the MEMS gyroscope 102 to generate the output sine wave, for example, as further described herein, regarding FIGS. 1-7.

In addition, exemplary apparatuses can comprise an NCO 414 configured to generate an output sine wave with a frequency of the sense resonant frequency (e.g., sense resonant frequency at the sense peak of the exemplary MEMS gyroscope 102) of the sense signal, for example, as further described herein, regarding FIGS. 1-7. Exemplary apparatuses can further comprise a DAC 212 configured to inject the output sine wave into the MEMS gyroscope 102 at the electrode (e.g., via self-test port 402), for example, as further described herein, regarding FIGS. 1-7.

Exemplary apparatuses as described herein can further comprise an amplitude regulation component 208 configured to detect an input amplitude of the sense signal at the sense peak and configured to regulate an output amplitude of the output sine wave injected into the MEMS gyroscope 102 based on the input amplitude of the sense signal at the sense peak, for example, as further described herein, regarding FIGS. 1-7. As a non-limiting example, the amplitude regulation component 208 can comprise an AGC loop (e.g., comprising summing junction 420 amplitude loop filter 422 and gain adjustment 210) configured to control gain (e.g., via gain adjustment 210) of the output sine wave injected into the MEMS gyroscope 102, for example, as further described herein, regarding FIGS. 1-7.

Further non-limiting apparatuses can comprise a phase shifter 406 configured to phase shift the sense signal ninety degrees to determine the sense resonant frequency (e.g., sense resonant frequency at the sense peak of the exemplary MEMS gyroscope 102), configured to phase shift the sense signal ninety degrees plus and minus a phase offset 408 (e.g., plus or minus 45 degrees), configured to estimate frequencies corresponding to the ninety degrees and the ninety degrees plus and minus the phase offset 408 (e.g., plus or minus 45 degrees), and configured to determine Q 702 for the sense resonant frequency (e.g., sense resonant frequency at the sense peak of the exemplary MEMS gyroscope 102) based on sense resonance, for example, as further described herein, regarding FIGS. 1-7. As a non-limiting example, the phase shifter 406 can be further configured to determine an offset change of the MEMS gyroscope 102 based on Q 702, for example, as further described herein, regarding FIGS. 1-7.

Exemplary apparatuses can further comprise one or more of an offset compensation component 218 associated with the MEMS gyroscope 102 configured to compensate for the offset change based on the sense resonant frequency (e.g., sense resonant frequency at the sense peak of the exemplary MEMS gyroscope 102) or a sensitivity compensation component 216 associated with the MEMS gyroscope 102 configured to compensate for a sensitivity change based on the sense resonant frequency (e.g., sense resonant frequency at the sense peak of the exemplary MEMS gyroscope 102), for example, as further described herein, regarding FIGS. 1-7. As a non-limiting example, the one or more of the offset change or the sensitivity change is due to a change in an environmental factor of a user device comprising the MEMS gyroscope 102, wherein the environmental factor can comprise one or more of temperature, pressure, package stress, or age associated with the MEMS gyroscope 102, for example, as further described herein, regarding FIGS. 1-7. As a further non-limiting example, the one or more of the offset compensation component 218 or the sensitivity compensation component 216 can be configured for use during periodic operation of the user device, for example, as further described herein, regarding FIGS. 1-7.

In addition, exemplary apparatuses can further comprise a vibration detection component or vibration detection and qualifier component 424 configured to determine that the sense resonant frequency (e.g., sense resonant frequency at the sense peak of the exemplary MEMS gyroscope 102) is invalid due to a determination of a detected vibration, for example, as further described herein, regarding FIGS. 1-7. As a non-limiting example, determination of a detected vibration can comprise a determination that the input amplitude of the sense signal at the sense peak falls outside of a predetermined amplitude range for normal MEMS gyroscope 102 operation, for example, as further described herein, regarding FIGS. 1-7.

FIG. 5 depicts an exemplary relation of drive-sense separation 502 to normalized sensitivity 504 associated with an exemplary MEMS gyroscope 102, according to various aspects as described herein. As described above, exemplary MEMS gyroscope 102 CMOS 202 can comprise an exemplary sensitivity compensation component 216. In a non-limiting aspect, an exemplary sensitivity compensation component 216 can be configured to compensate for a sensitivity change associated with the MEMS gyroscope 102 based on the determined sense resonant frequency of the sense signal (e.g., via exemplary sense frequency tracking component 206) and a relationship between drive-sense separation. For instance, based on characterization of exemplary MEMS gyroscope 102 (e.g., via device 1 506, device 2 508, etc.), there is a predetermined relationship between drive-sense separation 502 to normalized sensitivity 504. Thus, according to various embodiments, sense frequency tracking can be employed to determine drive-sense separation and thus compensate for a sensitivity change associated with the MEMS gyroscope 102 based on the determined sense resonant frequency of the sense signal (e.g., via exemplary sense frequency tracking component 206) as depicted in FIG. 5. It can be understood that characterization of exemplary MEMS gyroscope 102 (e.g., via device 1 506, device 2 508, etc.) can vary between devices and can be roughly linear in the area of interest 510, where normalized sensitivity is equal to about 1.0. In addition, although drive-sense separation for characterization of exemplary MEMS gyroscope 102 device 1 506 and device 2 508 are shown as having the same value of about 2 kHz, it can be understood that characterization of drive-sense separation for exemplary MEMS gyroscope 102 can vary between devices.

FIG. 6 depicts an exemplary plot 600 of a resonance peak 602 illustrating non-limiting aspects of sense resonant frequency $f_2$ and Q determination for an associated MEMS gyroscope 102, according to non-limiting embodiments described herein. For instance, as described above regarding FIG. 4, exemplary MEMS gyroscope 102 CMOS 202 can further comprise a phase shifter 406 that can be configured to phase shift the sense signal 90 degrees to determine the sense resonant frequency $f_2$, configured to phase shift the sense signal ninety degrees plus and minus a phase offset 408 (e.g., plus or minus 45 degrees), configured to estimate frequencies (e.g., $f_1$, $f_2$, $f_3$, etc.) corresponding to the ninety degrees and the ninety degrees plus and minus the phase offset 408 (e.g., plus or minus 45 degrees), and configured to determine Q for the sense resonant frequency $f_2$ based on sense resonance, for example, as depicted in FIG. 6.

FIG. 7 depicts an exemplary plot 700 of an exemplary relation of Q 702 versus gyroscope offset 704 for an exemplary MEMS gyroscope 102 that facilitates offset determination for an associated MEMS gyroscope 102, according to various aspects described herein. For example, as described above, exemplary MEMS gyroscope 102 CMOS 202 can further comprise an exemplary offset compensation component 218 that can be configured to compensate for an offset change associated with the MEMS gyroscope 102 based on the determined sense resonant frequency $f_2$ of the sense signal (e.g., via exemplary sense frequency tracking component 206) and a determined Q 702, for instance, as further described herein regarding FIGS. 6-7. Thus, with a determined Q 702 an offset can be determine to facilitate exemplary offset compensation component 218 compensation for an offset change associated with the MEMS gyroscope 102.

Figure 8:
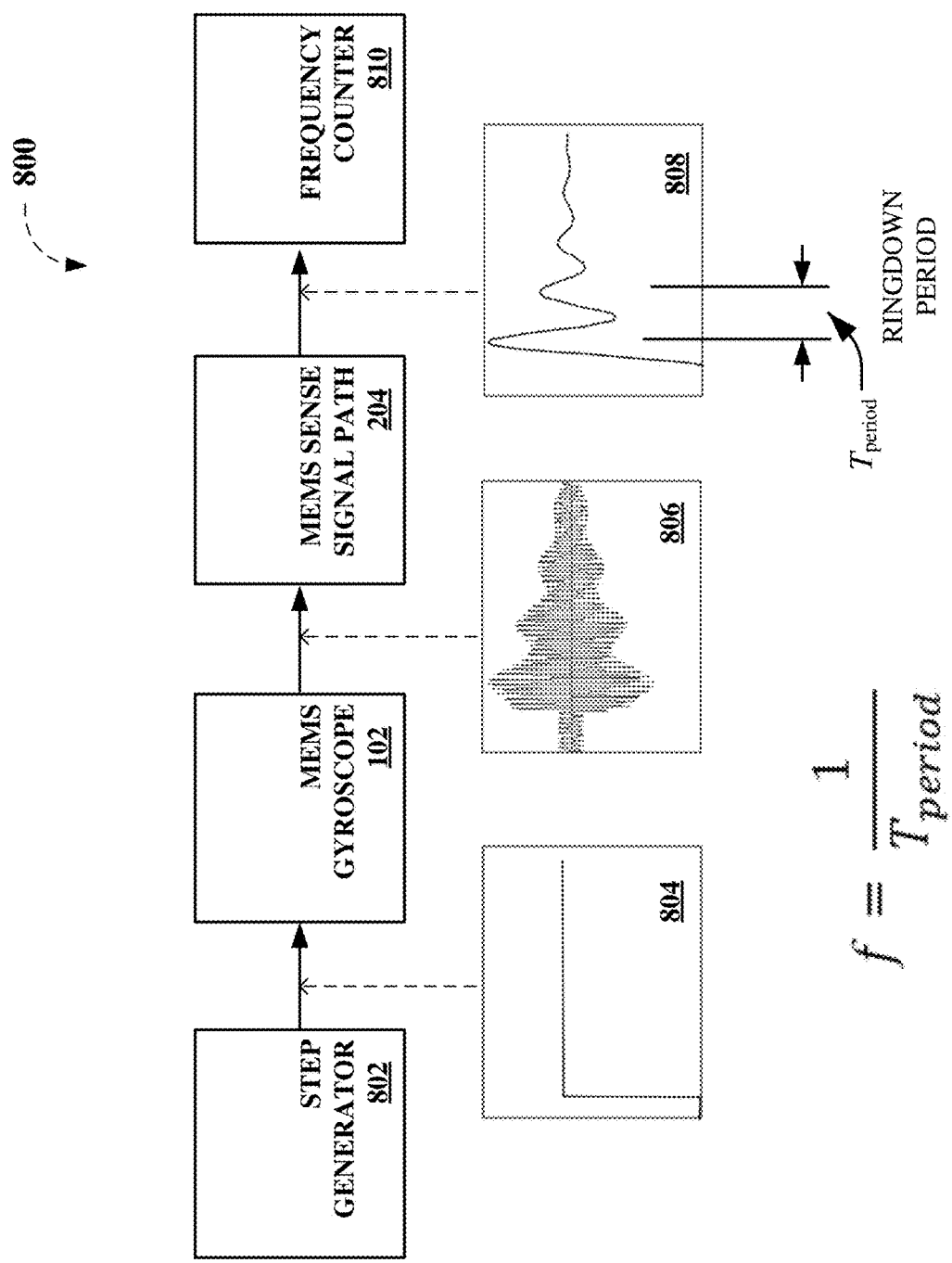
FIG. 8 depicts another functional block diagram of further non-limiting embodiments that facilitate sense frequency determination associated with an exemplary MEMS gyroscope based on injection of a step response, as described herein.

FIG. 8 depicts another functional block diagram 800 of further non-limiting embodiments that facilitates sense frequency determination based on injection of a step response, as described herein. For instance, exemplary embodiments can comprise a step generator 802 configured to apply a step response 804 to an exemplary MEMS gyroscope 102, which produces a modulated step response 806, which can be described as an amplitude modulated decaying signal. In a further non-limiting aspect, modulated step response 806, processed, via exemplary MEMS gyroscope 102 sense signal path 204, as further described herein, gets demodulated to produce a decaying ringdown pulse 808. One cycle of the ringdown pulse 808 can facilitate determining the $T_{period}$ by measure the step response ringdown (e.g., via exemplary frequency counter 810) at the output of exemplary MEMS gyroscope 102 sense signal path 204 having a tap-off point 308 in the MEMS gyroscope 102 sense signal path 204.

Exemplary apparatuses can comprise a MEMS gyroscope 102 having an electrode that can inject a step response (e.g., via self-test port 402) into the MEMS gyroscope 102 and a gyroscope sense path (e.g., exemplary MEMS gyroscope 102 sense signal path 204) configured to allow the detection of a sense signal, for example, as further described herein, regarding FIGS. 1-8. Exemplary apparatuses can further comprise a step generator 802 configured to generate the step response 804.

In addition exemplary apparatuses can comprise a measurement component to measure a step response ringdown pulse 808 at the output of the MEMS gyroscope 102, for example, as further described herein, regarding FIGS. 1-8. Further non-limiting apparatuses can comprise a sense frequency measurement component (e.g., frequency counter 810) configured to measure sense frequency of the step response ringdown pulse 808, for example, as further described herein, regarding FIGS. 1-8.

Exemplary apparatuses can further comprise one or more of an offset compensation component 218 associated with the MEMS gyroscope 102 configured to compensate for an offset change based on the sense resonant frequency (e.g., sense resonant frequency at the sense peak of the exemplary MEMS gyroscope 102) or a sensitivity compensation component 216 associated with the MEMS gyroscope 102 configured to compensate for a sensitivity change based on the sense resonant frequency (e.g., sense resonant frequency at the sense peak of the exemplary MEMS gyroscope 102), for example, as further described herein, regarding FIGS. 1-8. As a non-limiting example, the one or more of the offset change or the sensitivity change is due to a change in an environmental factor of a user device comprising the MEMS gyroscope 102, wherein the environmental factor can comprise one or more of temperature, pressure, package stress, or age associated with the MEMS gyroscope 102, for example, as further described herein, regarding FIGS. 1-8. As a further non-limiting example, the one or more of the offset compensation component 218 or the sensitivity compensation component 216 can be configured for use during periodic operation of the user device, for example, as further described herein, regarding FIGS. 1-8.

Figure 9:
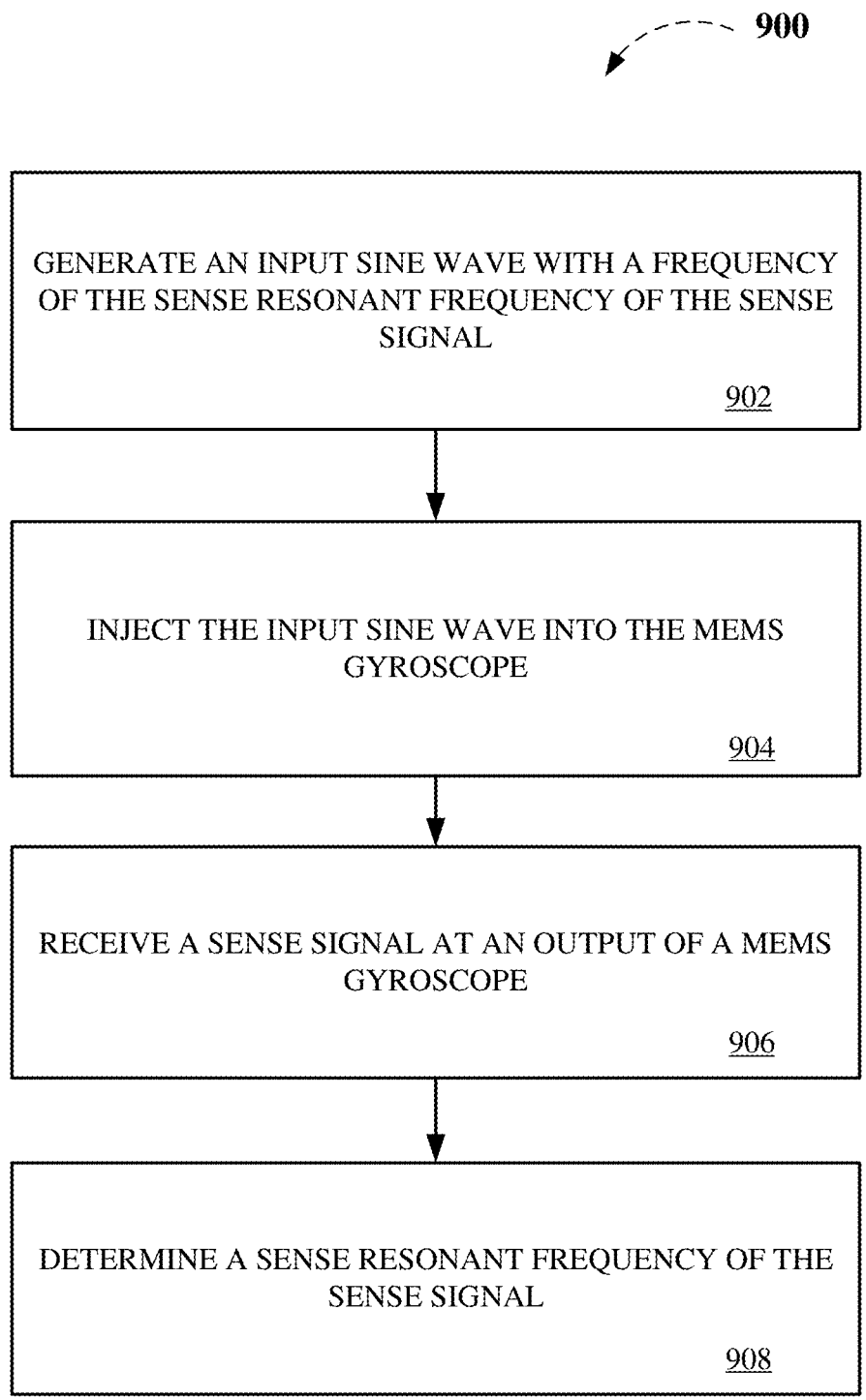
FIG. 9 depicts an exemplary flowchart of non-limiting methods associated with exemplary MEMS gyroscopes and sense frequency tracking, according to various non-limiting aspects of the disclosed subject matter.
Figure 10:
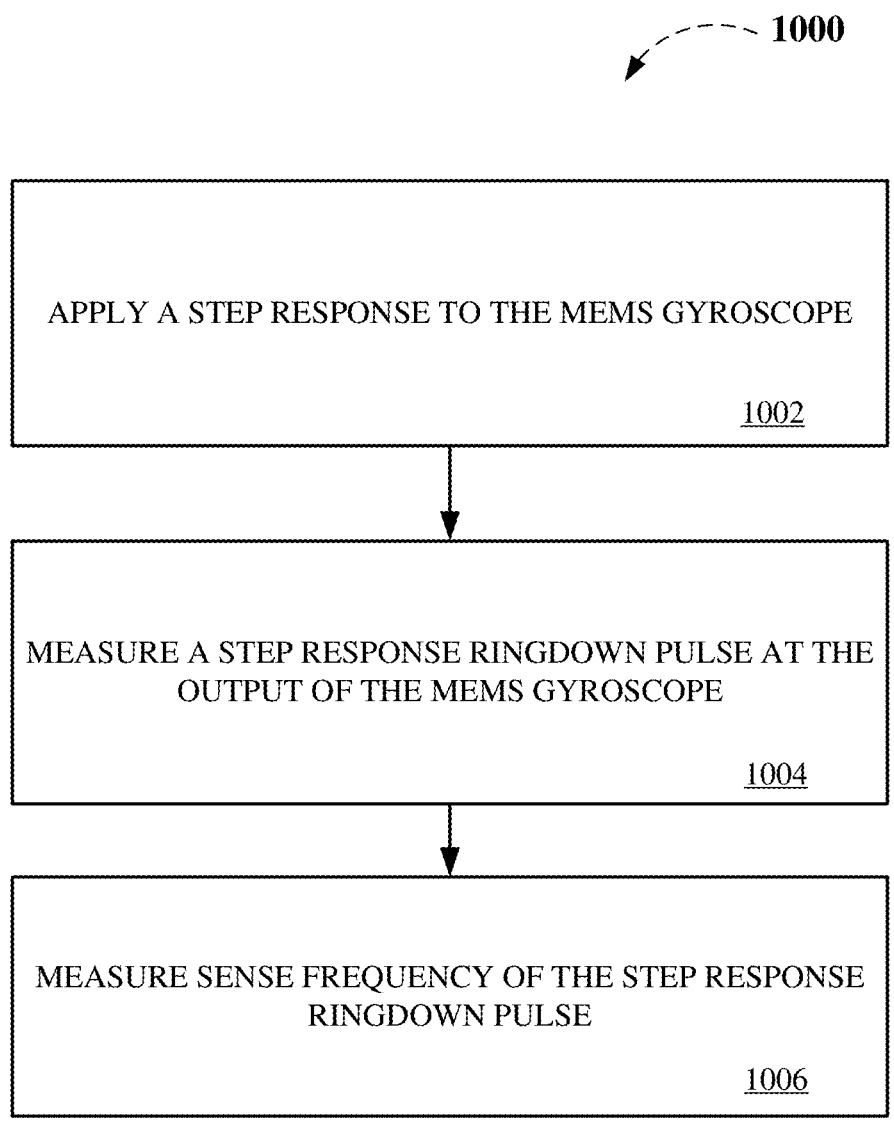
FIG. 10 depicts another exemplary flowchart of non-limiting methods associated with exemplary MEMS gyroscopes and sense frequency tracking, according to various non-limiting aspects of the disclosed subject matter.

In view of the subject matter described supra, methods that can be implemented in accordance with the disclosed subject matter will be better appreciated with reference to the flowcharts of FIG. 9-10. While for purposes of simplicity of explanation, the methods are shown and described as a series of blocks, it is to be understood and appreciated that such illustrations or corresponding descriptions are not limited by the order of the blocks, as some blocks may occur in different orders and/or concurrently with other blocks from what is depicted and described herein. Any non-sequential, or branched, flow illustrated via a flowchart should be understood to indicate that various other branches, flow paths, and/orders of the blocks, can be implemented which achieve the same or a similar result. Moreover, not all illustrated blocks may be required to implement the methods described hereinafter.

Exemplary Methods

FIG. 9 depicts an exemplary flowchart of non-limiting methods 900 associated with exemplary MEMS gyroscopes 102 and sense frequency tracking, according to various non-limiting aspects of the disclosed subject matter. Exemplary methods 900 can comprise, at 902, generating an input sine wave with a frequency of the sense resonant frequency (e.g., sense resonant frequency at the sense peak of the exemplary MEMS gyroscope 102) of the sense signal, for example, as further described herein, regarding FIGS. 1-8. As a non-limiting example, generating the input sine wave can comprise modulating 416 an output signal of the NCO 414 with a function of a drive frequency associated with the MEMS gyroscope 102, as further described herein, regarding FIGS. 1-8.

Exemplary methods 900 can further comprise, at 904, injecting (e.g., via self-test port 402) the input sine wave into the MEMS gyroscope 102, for example, as further described herein, regarding FIGS. 1-8. In addition, exemplary methods 900 can comprise, at 906, receiving a sense signal at an output of a MEMS gyroscope 102, for example, as further described herein, regarding FIGS. 1-8.

Exemplary methods 900 can further comprise, at 908, determining a sense resonant frequency (e.g., sense resonant frequency at the sense peak of the exemplary MEMS gyroscope 102) of the sense signal, for example, as further described herein, regarding FIGS. 1-8. As a non-limiting example, determining the sense resonant frequency (e.g., sense resonant frequency at the sense peak of the exemplary MEMS gyroscope 102) of the sense signal can comprise determining the sense resonant frequency (e.g., sense resonant frequency at the sense peak of the exemplary MEMS gyroscope 102) using a sense frequency tracking component 206, as further described herein, regarding FIGS. 1-8. For instance, using the sense frequency tracking component 206 can comprise using a digital phase locked loop comprising a phase detector 410, a digital loop filter 412, and a NCO 414 configured to estimate the sense resonant frequency (e.g., sense resonant frequency at the sense peak of the exemplary MEMS gyroscope 102) of the sense signal, in further non-limiting aspects.

Exemplary methods 900 can further comprise, detecting an output amplitude (e.g., via amplitude detector 418) of the sense signal at a sense peak and regulating an input amplitude of the input sine wave injected into the MEMS gyroscope 102 based on the output amplitude (e.g., detected via amplitude detector 418) of the sense signal at the sense peak, for example, as further described herein, regarding FIGS. 1-8. As a non-limiting example, the regulating the input amplitude of the input sine wave injected into the MEMS gyroscope 102 can comprise controlling gain of the input sine wave injected into the MEMS gyroscope 102 via an AGC loop comprising summing junction 420 amplitude loop filter 422 and gain adjustment 210, as further described herein, regarding FIGS. 1-8.

In addition, exemplary methods 900 can further comprise, phase shifting (e.g., via phase shifter 406) the sense signal 90 degrees to determine the sense resonant frequency (e.g., sense resonant frequency $f_2$ at the sense peak of the exemplary MEMS gyroscope 102), for example, as further described herein, regarding FIGS. 1-8. In addition, exemplary methods 900 can comprise, phase shifting (e.g., via phase shifter 406) the sense signal ninety degrees plus and minus a phase offset (e.g., plus or minus forty five degrees), estimating frequencies (e.g., via the sense frequency tracking component 206) corresponding to the phase shifting the ninety degrees and the ninety degrees plus and minus the phase offset, and/or determining Q 702 for the sense resonant frequency (e.g., sense resonant frequency at the sense peak of the exemplary MEMS gyroscope 102) based on sense resonance, for example, as further described herein, regarding FIGS. 1-8. Exemplary methods 900 can further comprise, determining an offset change of the MEMS gyroscope 102 based on the determined Q 702, for example, as further described herein, regarding FIGS. 1-8.

In other non-limiting implementations, exemplary methods 900 can comprise, compensating for one or more of the offset change or a sensitivity change associated with the MEMS gyroscope 102 based on the determining the sense resonant frequency (e.g., sense resonant frequency at the sense peak of the exemplary MEMS gyroscope 102) of the sense signal via one or more of the sensitivity compensation component 216 or the offset compensation component 218, for example, as further described herein, regarding FIGS. 1-8. As a non-limiting example, compensating for the one or more of the offset change or the sensitivity change associated with the MEMS gyroscope 102 can comprise compensating for the one or more of the offset change or the sensitivity change due to a change in an environmental factor of a user device comprising the MEMS gyroscope 102, wherein the environmental factor can comprise one or more of temperature, pressure, package stress, or age associated with the MEMS gyroscope 102, as further described herein, regarding FIGS. 1-8. For instance, compensating for the one or more of the offset change or the sensitivity change can comprise compensating for the one or more of the offset change or the sensitivity change periodically during operation of the user device, in further non-limiting aspects.

Exemplary methods 900 can further comprise, determining that the sense resonant frequency (e.g., sense resonant frequency at the sense peak of the exemplary MEMS gyroscope 102) is invalid via a vibration detection circuit (e.g., exemplary vibration detection component or vibration detection and qualifier component 424), for example, as further described herein, regarding FIGS. 1-8. As a non-limiting example, determining that the sense resonant frequency (e.g., sense resonant frequency at the sense peak of the exemplary MEMS gyroscope 102) is invalid via the vibration detection circuit (e.g., exemplary vibration detection component or vibration detection and qualifier component 424) can comprise determining with the vibration detection circuit (e.g., exemplary vibration detection component or vibration detection and qualifier component 424) that the output amplitude of the sense signal at the sense peak falls outside of a predetermined amplitude range for normal MEMS gyroscope 102 operation, as further described herein, regarding FIGS. 1-8.

FIG. 10 depicts another exemplary flowchart of non-limiting methods 1000 associated with exemplary MEMS gyroscopes 102 and sense frequency tracking, according to various non-limiting aspects of the disclosed subject matter. Exemplary methods 1000 can comprise receiving a sense signal at an output of a MEMS gyroscope 102 and determining a sense resonant frequency (e.g., sense resonant frequency at the sense peak of the exemplary MEMS gyroscope 102) of the sense signal, for example, as further described herein, regarding FIGS. 1-8. For example, exemplary methods 1000 can comprise, at 1002, applying a step response 804 to the MEMS gyroscope 102, for example, as further described herein, regarding FIGS. 1-8.

Exemplary methods 1000 can further comprise, at 1004, measuring a step response ringdown pulse 808 at the output of the MEMS gyroscope 102, for example, as further described herein, regarding FIGS. 1-8.

In addition, exemplary methods 1000 can further comprise, at 1006, measuring sense frequency (e.g., via frequency counter 810) of the step response ringdown pulse 808, for example, as further described herein, regarding FIGS. 1-8. As a non-limiting example, measuring sense frequency of the step response ringdown pulse 808 can comprise using one or more of a frequency counter 810 or a frequency estimation circuit (not shown) to measure the sense frequency of the step response ringdown pulse 808, as further described herein, regarding FIGS. 1-8.

What has been described above includes examples of the embodiments of the disclosed subject matter. It is, of course, not possible to describe every conceivable combination of configurations, components, and/or methods for purposes of describing the claimed subject matter, but it is to be appreciated that many further combinations and permutations of the various embodiments are possible. Accordingly, the claimed subject matter is intended to embrace all such alterations, modifications, and variations that fall within the spirit and scope of the appended claims. While specific embodiments and examples are described in disclosed subject matter for illustrative purposes, various modifications are possible that are considered within the scope of such embodiments and examples, as those skilled in the relevant art can recognize.

In addition, the words "example" or "exemplary" is used herein to mean serving as an example, instance, or illustration. Any aspect or design described herein as "exemplary" is not necessarily to be construed as preferred or advantageous over other aspects or designs. Rather, use of the word, "exemplary," is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while an aspect may have been disclosed with respect to only one of several embodiments, such feature may be combined with one or more other features of the other embodiments as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements. Numerical data, such as voltages, ratios, and the like, are presented herein in a range format. The range format is used merely for convenience and brevity. The range format is meant to be interpreted flexibly to include not only the numerical values explicitly recited as the limits of the range, but also to include all the individual numerical values or sub-ranges encompassed within the range as if each numerical value and sub-range is explicitly recited. When reported herein, any numerical values are meant to implicitly include the term "about." Values resulting from experimental error that can occur when taking measurements are meant to be included in the numerical values.

What is claimed is:

1. A method, comprising:
   receiving a sense signal at an output of a microelectromechanical systems (MEMS) gyroscope at a sense-to-sense feedback loop comprising the MEMS gyroscope sense signal path, wherein the output of the MEMS gyroscope is based at least in part on a displacement vector associated with the MEMS gyroscope;
   determining a sense resonant frequency of the sense signal, comprising determining the sense resonant frequency using a frequency to digital converter that comprises using a digital phase locked loop comprising a phase detector, a digital loop filter, and a numerically controlled oscillator (NCO) configured to estimate the sense resonant frequency of the sense signal;
   generating an input sine wave with a frequency of the sense resonant frequency of the sense signal; and
   injecting the input sine wave into the MEMS gyroscope via the sense-to-sense feedback loop, comprising injecting the input sine wave into the MEMS gyroscope via the sense-to-sense feedback loop, wherein the sense-to-sense feedback loop initiates at the output of the MEMS gyroscope characterized by the displacement vector associated with the MEMS gyroscope and terminates at a digital to analog converter (DAC) that facilitates the injecting the input sine wave at an input of the MEMS gyroscope sense signal path.

2. The method of claim 1, wherein the generating the input sine wave comprises modulating an output signal of the NCO with a function of a drive frequency associated with the MEMS gyroscope.

3. The method of claim 1, further comprising:
   detecting an output amplitude of the sense signal at a sense peak; and
   regulating an input amplitude of the input sine wave injected into the MEMS gyroscope based at least in part on the output amplitude of the sense signal at the sense peak.

4. The method of claim 3, wherein the regulating the input amplitude of the input sine wave injected into the MEMS gyroscope comprises controlling gain of the input sine wave injected into the MEMS gyroscope via an automatic gain control loop.

5. The method of claim 1, further comprising:
   determining that the sense resonant frequency is invalid via a vibration detection circuit.

6. The method of claim 5, wherein the determining that the sense resonant frequency is invalid via the vibration detection circuit comprises determining with the vibration detection circuit that the output amplitude of the sense signal at the sense peak falls outside of a predetermined amplitude range for normal MEMS gyroscope operation.

7. An apparatus, comprising:
   a microelectromechanical systems (MEMS) gyroscope having an electrode that can inject a force signal into the MEMS gyroscope via a sense-to-sense feedback loop comprising a gyroscope sense path configured to allow the detection of a sense signal at a sense peak;
   a frequency to digital converter configured to determine, at an output of the MEMS gyroscope, a sense resonant frequency of the sense signal at the sense-to-sense feedback loop comprising the gyroscope sense path at the sense peak, wherein the output of the MEMS gyroscope is based at least in part on a displacement vector associated with the MEMS gyroscope;
   a numerically controlled oscillator (NCO) of the frequency to digital converter configured to generate an output sine wave with a frequency of the sense resonant frequency of the sense signal; and
   a digital to analog converter (DAC) configured to inject the output sine wave into the MEMS gyroscope at the electrode, wherein the sense-to-sense feedback loop comprising the gyroscope sense path initiates at the output of the MEMS gyroscope characterized by the displacement vector associated with the MEMS gyroscope and terminates at the DAC configured to inject the output sine wave at an input of the sense path.

8. The apparatus of claim 7, wherein the frequency to digital converter comprises a phase detector, a digital loop filter, and the NCO, which is further configured to estimate the sense resonant frequency of the sense signal.

9. The apparatus of claim 8, wherein an output of the NCO is modulated with a function of a drive frequency associated with the MEMS gyroscope to generate the output sine wave.

10. The apparatus of claim 9, further comprising:
    a vibration detection component configured to determine that the sense resonant frequency is invalid due to a determination of a detected vibration.

11. The apparatus of claim 10, wherein the determination of a detected vibration comprises a determination that the input amplitude of the sense signal at the sense peak falls outside of a predetermined amplitude range for normal MEMS gyroscope operation.

12. The apparatus of claim 7, further comprising:
    an amplitude regulation component configured to detect an input amplitude of the sense signal at the sense peak and configured to regulate an output amplitude of the output sine wave injected into the MEMS gyroscope based at least in part on the input amplitude of the sense signal at the sense peak.

13. The apparatus of claim 12, wherein the amplitude regulation component comprises an automatic gain control loop configured to control gain of the output sine wave injected into the MEMS gyroscope.

* * * * *